US007201070B2

(12) United States Patent
Tokumoto

(10) Patent No.: US 7,201,070 B2
(45) Date of Patent: Apr. 10, 2007

(54) ROTATIONAL ANGLE DETECTING APPARATUS AND TORQUE DETECTING APPARATUS

(75) Inventor: Yoshitomo Tokumoto, Nabari (JP)

(73) Assignee: Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 11/022,003

(22) Filed: Dec. 22, 2004

(65) Prior Publication Data

US 2005/0139017 A1 Jun. 30, 2005

(30) Foreign Application Priority Data

Dec. 26, 2003 (JP) ............................ 2003-435522

(51) Int. Cl.
*G01L 3/02* (2006.01)

(52) U.S. Cl. ................................................. 73/862.328

(58) Field of Classification Search ............................... 73/862.325–862.332
See application file for complete search history.

(56) References Cited

U.S. PATENT DOCUMENTS

| | | | | |
|---|---|---|---|---|
| 6,229,301 | B1 | 5/2001 | Bolli et al. | |
| 6,536,293 | B2 * | 3/2003 | Shiba | 73/862.193 |
| 6,948,385 | B2 * | 9/2005 | Tokumoto et al. | 73/862.334 |
| 6,988,421 | B2 * | 1/2006 | Tokumoto | 73/862.333 |
| 7,087,889 | B2 * | 8/2006 | Shiba | 250/231.13 |
| 2002/0124663 | A1 | 9/2002 | Tokumoto et al. | |
| 2003/0218126 | A1 * | 11/2003 | Shiba | 250/231.13 |

FOREIGN PATENT DOCUMENTS

| | | |
|---|---|---|
| EP | 0 274 841 A | 7/1988 |
| EP | 1 364 859 A | 11/2003 |
| JP | 2003-083823 | 3/2003 |
| JP | 2003-344188 | 12/2003 |

* cited by examiner

*Primary Examiner*—Max Noori
(74) *Attorney, Agent, or Firm*—Darby & Darby

(57) ABSTRACT

A rotational angle detecting apparatus, in which first targets and second targets, the number thereof is coprime with each other, are provided at the rotors rotating coaxially with each other. Rotational angle of the rotor is detected based on the detection signals from each of two sensors disposed opposite to the targets respectively, which output detection signals having phases different from each other as the rotor rotates. Based on a magnitude relation between one detection signal and the other detection signal from each of the two sensors, the range of the electrical angle of the other detection signals is determined. Relation between a detection signal and an electrical angle is stored in advance. Based on the determined electrical angle, and referring to the relation, the electrical angle of the other detection signal is obtained; thus, the rotational angle of the rotor is detected.

10 Claims, 12 Drawing Sheets

ROTATIONAL ANGLE DETECTING APPARATUS AND TORQUE DETECTING APPARATUS

CROSS-REFERENCE TO RELATED APPLICATIONS

This Nonprovisional application claims priority under 35 U.S.C.§119(a) on Patent Application No. 2003-435522 filed in Japan on Dec. 26, 2003, the entire contents of which are hereby incorporated by reference.

BACKGROUND OF THE INVENTION

The present invention relates to a rotational angle detecting apparatus and a torque detecting apparatus comprising one or a plurality of targets provided at a rotor and a plurality of detection means disposed opposite to the targets, for outputting detection signals having phases different from each other in accordance with each position of the targets as the rotor rotates.

As a steering apparatus for automobiles, an electric power steering apparatus, which drives an electric motor to assist steering and reduce driver's load, is known. Such electric power steering apparatus comprises an input shaft joined to steering member (steering wheel), an output shaft joined to steerable wheels via a rack-and-pinion or the like and a connection shaft that connects the input shaft to the output shaft. On the basis of torsion angle, which is generated on the connection shaft, the torque sensor detects the steering torque applied to the input shaft. And on the basis of the steering torque detected by the torque sensor, the electric motor for assisting the steering, which is interlocked with the output shaft, is controlled to drive. The present applicant has proposed a rotational angle detecting apparatus and a torque detecting apparatus suitable for steering apparatus for automobiles (Japanese Patent Application Laid-Open No. 2003-83823).

Further, the present applicant has proposed a rotational angle detecting apparatus and a torque detecting apparatus equipped with the rotational angle detecting apparatus (torque sensor) (Japanese Patent Application No. 2003-344188). That is, the rotational angle detecting apparatus comprises two detection means, which are disposed respectively opposite to first targets provided at a rotor and second targets provided at the rotor, the number of the second targets is coprime with the number of the first targets; the two detection means output detection signals having phases different from each other as the rotor rotates. The rotational angle detecting apparatus further comprises calculating means for executing a predetermined calculation using the detection signals each outputted by the two detection means and storing means for storing the relation between the result of calculation executed by the calculating means in advance and the electrical angles of detection signals, in which, on the basis of the result of calculation executed by the calculating means and by referring to the storing means, an electrical angle of the detection signals is obtained, and on the basis of the obtained electrical angle, the rotational angle of the rotor is detected.

In the rotational angle detecting apparatus and the torque detecting apparatus disclosed in the above-mentioned Japanese Patent Application Laid-Open No. 2003-344188, for instance, one of the detection signals is approximated to a sine wave and the phase contrast is set to 90° (Accordingly, the other detection signal is approximated to cosine wave), the rotational angle $\theta$ is obtained from $\theta=\tan^{-1}\theta=\tan^{-1}(\sin\theta/\cos\theta)$. However, the detection signals include some errors such as ripples. When the calculation such as $\sin\theta/\cos\theta$ is executed using the detection signals including the errors, the errors included in the result of the calculation become larger than the original errors. Therefore, there resides such a problem that rotational angle is hardly obtained precisely.

BRIEF SUMMARY OF THE INVENTION

The present invention has been proposed in view of the above-described problem, and an object thereof is to provide a rotational angle detecting apparatus capable of precisely obtaining rotational angle.

Another object of the present invention is to provide a torque detecting apparatus capable of precisely detecting torque value.

A rotational angle detecting apparatus according to the present invention comprises one or a plurality of first targets provided at a rotor, second targets provided at the rotor or another rotor rotating coaxially with the rotor, the number of which is coprime with the number of the first targets, and two detection means, disposed opposite to the first targets and second targets, for outputting detection signals having phases different from each other in accordance with each position of the first targets and the second targets as the rotor provided with the first targets rotates; whereby a rotational angle of the rotor is detected on the basis of the detection signals outputted by each of the detection means, characterized by comprising determination means for, on the basis of the magnitude relation between the detection signals outputted by each one of the respective two detection means disposed opposite to the first targets and the second targets and the detection signals outputted by each the other, determining the range of electrical angles of the detection signals outputted by each the other, storing means for storing a relation between the detection signal measured in advance and an electrical angle, obtaining means for, on the basis of the range of the electrical angles determined by the determination means and by referring to the storing means, obtaining electrical angle of each of the detection signals outputted by each the other, whereby the rotational angle of the rotor is detected on the basis of the electrical angle obtained by the obtaining means.

According to the rotational angle detecting apparatus of the present invention, since such a calculation that a large error is resulted in is not carried out, a rotational angle detecting apparatus capable of precisely obtaining rotational angle can be achieved.

A torque detecting apparatus according to the present invention comprises rotors coaxially provided to a first shaft and a second shaft connected via a connection shaft, one or a plurality of targets provided at the rotors, and two detection means, each disposed opposite to the targets, outputting detection signals having phases different from each other in accordance with each position of the targets as the rotors rotate; whereby the torque of the first shaft or the second shaft is detected on the basis of each of the detection signals outputted by the detection means, characterized by comprising determination means for, on the basis of the magnitude relation between the detection signals outputted by each one of the respective two detection means disposed opposite to the targets and the detection signals outputted by each the other, determining the range of electrical angles of the detection signals outputted by each the other, storing means for storing a relation between the detection signal measured in advance and an electrical angle, and obtaining means for, on the basis of the range of the electrical angle determined the determination means and by referring to the storing means, obtaining electrical angle of each of the detection signals outputted by each the other; whereby the torque is detected on the basis of the obtained electrical angle.

According to the torque detecting apparatus of the present invention, since such a calculation that a large error is resulted in is not carried out, a torque detecting apparatus capable of precisely obtaining torque value can be achieved.

The above and further objects and features of the invention will more fully be apparent from the following detailed description with accompanying drawings.

DETAILED DESCRIPTION OF THE INVENTION

Figure 1:
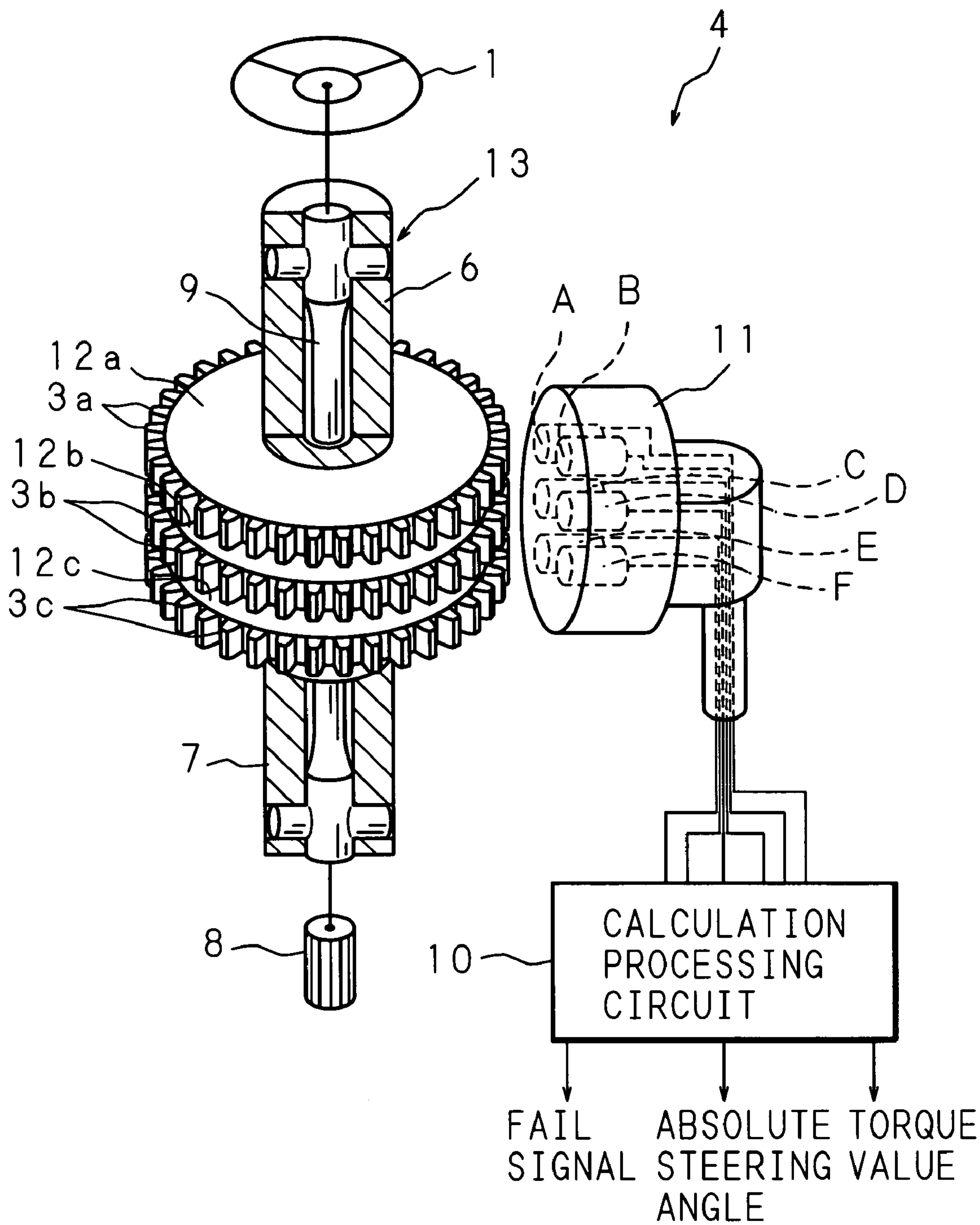
FIG. 1 is a view schematically showing the constitution of a rotational angle detecting apparatus and a torque detecting apparatus according to an embodiment of the present invention.

Hereinafter, referring to the drawings showing the embodiments, the present invention will be described in detail.

FIG. 1 is a view schematically showing the constitution of a rotational angle detecting apparatus and a torque detecting apparatus according to an embodiment of the present invention. The rotational angle detecting apparatus and the torque sensor 4 (torque detecting apparatus) comprise an input shaft 6 (rotor, first shaft) of which upper end is joined to a steering member 1 (steering wheel) and an output shaft 7 (rotor, second shaft) of which lower end is joined to a pinion 8 of a steering mechanism. The input shaft 6 and the output shaft 7 are coaxially joined to each other being interposed by a torsion bar 9 (connection shaft) of a small diameter. Thus, a steering shaft 13, which connects the steering member 1 to the steering mechanism, is structured. The vicinity of the connecting section between the input shaft 6 and the output shaft 7 is structured as described below.

In the vicinity of the outer end of the connecting section between the input shaft 6 and the output shaft 7, fitted coaxially with the input shaft 6 on the outer side thereof is a target plate 12*a* in the shape of a disk. On the peripheral surface of the target plate 12*a*, pluralities of projecting targets 3*a* formed of magnetic material; i.e., for instance, 37 projections are formed being projected at the same intervals in a circumferential direction. The target 3*a* comprises a plurality of teeth of a spur gear. The spur gears in the shape of a ring form the target plate 12*a* and the targets 3*a*.

In the vicinity of the outer end of the connecting section between the input shaft 6 and the output shaft 7, fitted coaxially with the output shaft 7 on the outer side thereof are target plates 12*b* and 12*c* (rotors) in the shape of a disk respectively with the target plate 12*b* at the input shaft 6 side. On the peripheral surface of the target plate 12*b*, pluralities of projecting targets 3*b* formed of a magnetic material; i.e., 37 projections same as those of the targets 3*a* are formed at the same intervals being aligned with the targets 3*a* in a circumferential direction. On the peripheral surface of the target plate 12*c*, projections formed of a magnetic material; number of targets 3*c* coprime with the number of the targets 3*b*, which are, for instance, 36 projections are formed being projecting at the same intervals in a circumferential direction. Here, the wording "number coprime with each other" means a number, which does not have any common denominator other than 1. The targets 3*b* and 3*c* comprise teeth of the spur gears. The spur gears in the shape of a ring form the target plates 12*b*, 12*c* and the targets 3*b*, 3*c*.

Disposed at the outer side of the target plates 12*a*, 12*b* and 12*c* is a sensor box 11 being faced to the outer edge of the targets 3*a*, 3*b* and 3*c* on the periphery thereof. The sensor box 11 is fixed and supported by an immobile part such as a housing (not shown), which receives and supports the input shaft 6 and the output shaft 7. Inside the sensor box 11, magnetometric sensors A and B (detection means), which respectively face to the portions different from each other in the circumferential direction of the target 3*a* at the input shaft 6 side, and magnetometric sensors C and D (detection means), which face to the portions different from each other in the circumferential direction of the target 3*b* at the output shaft 7 side are received with positions thereof correctly aligned in the circumferential direction. Further, magnetometric sensors E and F (detection means), which face to the portions different from each other in the circumferential direction of the targets 3*c* at the output shaft 7 side, are received.

The magnetometric sensors A, B, C, D, E and F are the sensors formed of an element such as magneto resistive effect element (MR element) or the like, which has such characteristic that the electric characteristic (resistance) changes due to the influence of the magnetic field, whereby the detection signal changes in accordance with a change in an adjacent portion of the target 3*a*, 3*b* or 3*c* which the magnetometric sensor opposes. These detection signals are given to a calculation processing circuit 10 comprising a microprocessor provided outside or inside the sensor box 11.

Figure 2:
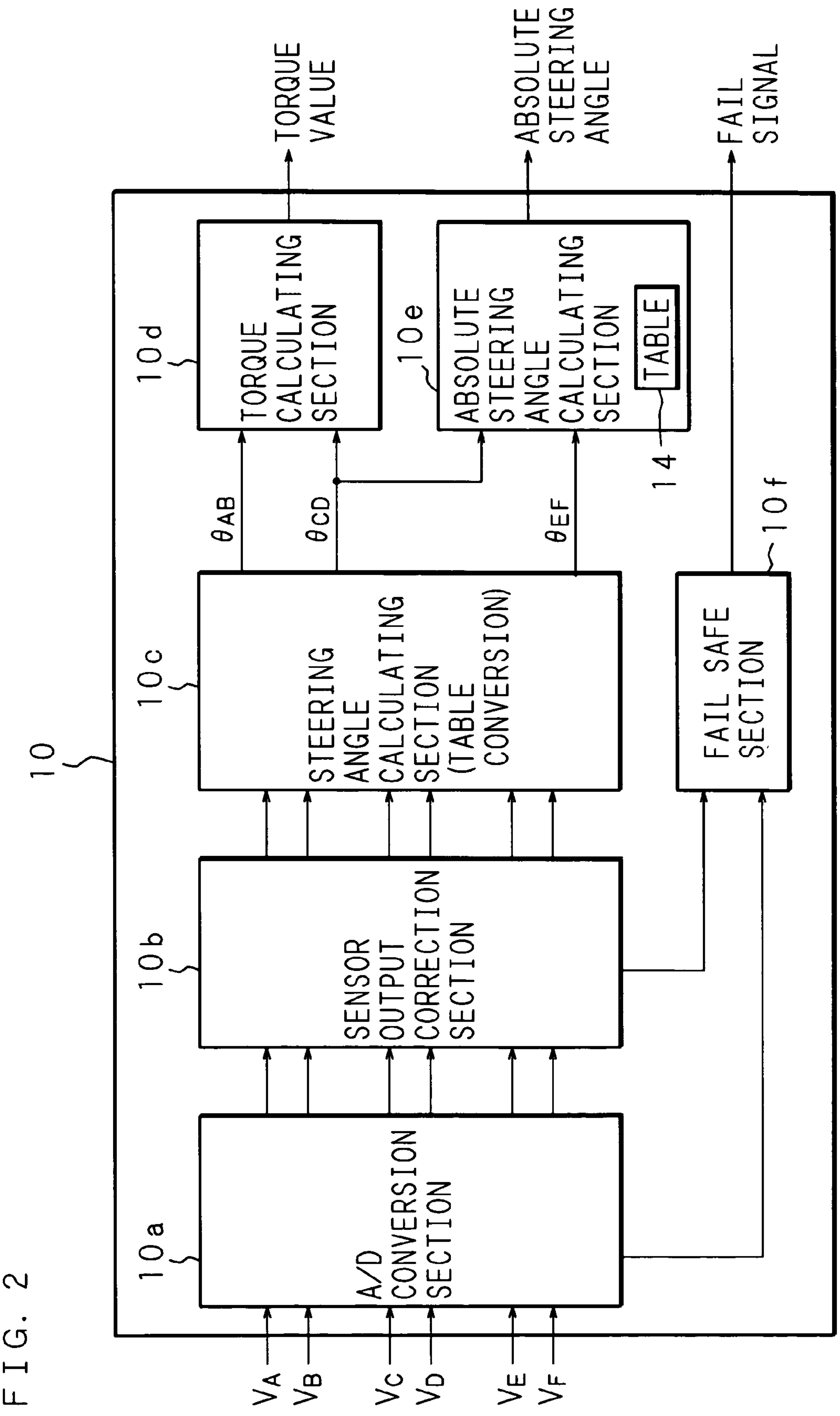
FIG. 2 is a block diagram showing an example of the internal configuration of a calculation processing circuit.

FIG. 2 is a block diagram showing an example of the internal configuration of the calculation processing circuit 10. The calculation processing circuit 10 comprises an A/D conversion section 10*a* that performs analog/digital conversion of the detection signals $V_A$, $V_B$, $V_C$, $V_D$, $V_E$, and $V_F$ respectively, which are outputted by the magnetometric sensors A, B, C, D, E and F, and a sensor output correction section 10_b_ that corrects the detection signals $V_A$, $V_B$, $V_C$, $V_D$, $V_E$, and $V_F$ after the analog/digital conversion-and outputs the corrected detection signals $V_A'$, $V_B'$, $V_C'$, $V_D'$, $V_E'$, and $V_F'$.

The calculation processing circuit 10 also comprises a steering angle calculating section 10_c_ that includes a table (storing means) storing the relation between the corrected detection signals $V_A'$ and $V_B'$, which are actually measured in advance before shipment from plant, and the electrical angle; a table (storing means) storing the relation between the corrected detection signals $V_C'$ and $V_D'$ and the electrical angle; and a table (storing means) storing the relation between the corrected detection signals $V_E'$ and $V_F'$ and the electrical angle, and outputs electrical angles $\theta_{AB}$, $\theta_{CD}$, and $\theta_{EF}$ of the input shaft 6 and the output shaft 7 on the basis of the corrected detection signals $V_A'$, $V_B'$, $V_C'$, $V_D'$, $V_E'$ and $V_F'$.

Further, the calculation processing circuit 10 comprises a torque calculating section 10_d_ that calculates and outputs the torque value between the input shaft 6 and the output shaft 7 on the basis of the electrical angle $\theta_{AB}$ and $\theta_{CD}$, an absolute steering angle calculating section 10_e_ that includes a table 14 for storing the absolute steering angles when the output shaft 7 turns and the electrical angles $\theta_{CD}$ and $\theta_{EF}$ (electrical angles of the targets 3_b_ and 3_c_) while connecting to each other and calculates and outputs the absolute steering angle of the output shaft 7 on the basis of the electrical angles $\theta_{CD}$ and $\theta_{EF}$, and a fail safe section 10_f_ that determines whether or not any failure has occurred on the basis of the signals from the A/D conversion section 10_a_ and the sensor output correction section 10_b_, and when a failure has occurred, outputs a fail signal.

Figure 3A:
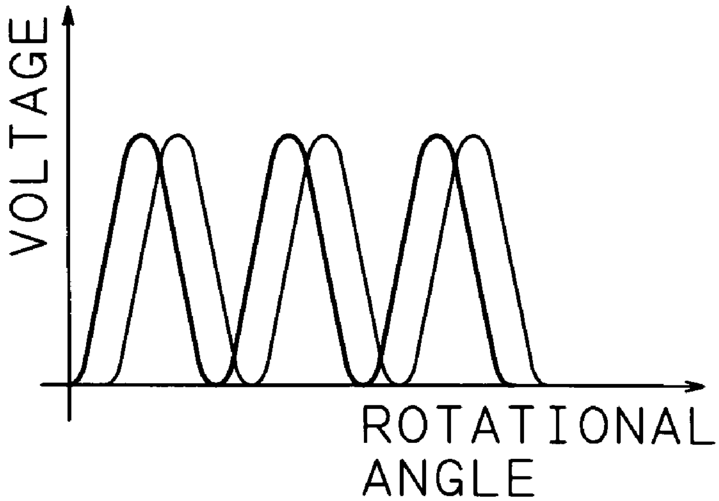
FIGS. 3A–3C are diagrams each showing an example of waveform of detection signals detected by magnetometric sensors.
Figure 3B:
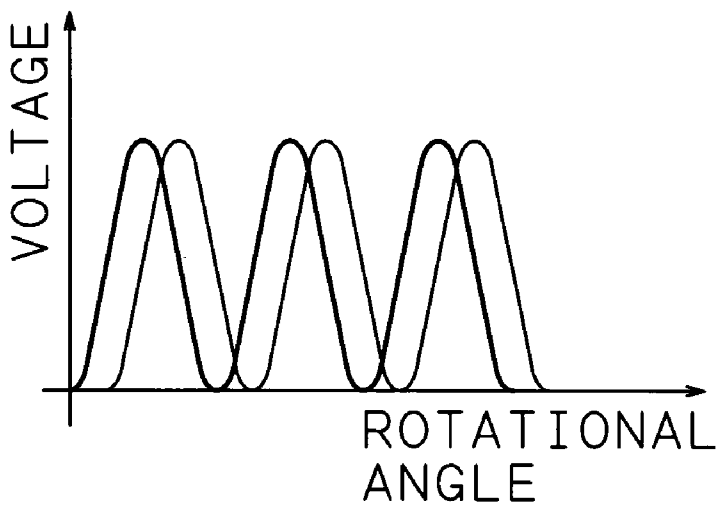
Figure 3C:
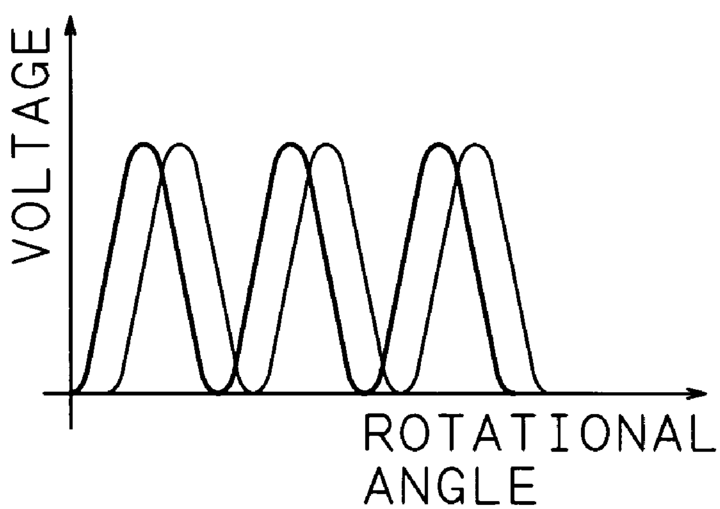

In the torque sensor 4, which has the constitution as described above, as shown in FIGS. 3A, 3B and 3C, each of the magnetometric sensors A, B, C, D, E and F outputs detection signal similar to a sine wave, which rises and lowers in accordance with the changes in the rotational angle of the input shaft 6 and the output shaft 7 while the corresponding targets 3_a_, 3_b_ and 3_c_ pass through the points opposite to each of the sensors. The detection signals from the magnetometric sensors A and B correspond to the rotational angle of the input shaft 6, to which the targets 3_a_ corresponding to the sensors A and B is provided; the detection signals of the magnetometric sensors C and D correspond to the rotational angle of the output shaft 7, to which targets 3_b_ corresponding to the sensors C and D is provided; and the detection signals of the magnetometric sensors E and F correspond to the rotational angle of the output shaft 7, to which targets 3_c_ opposite to the sensors E and F are provided.

Accordingly, the calculation processing circuit 10 can calculate the relative rotation angle of the input shaft 6 on the basis of the detection signals of the magnetometric sensors A and B; thus, the calculation processing circuit 10 and the magnetometric sensors A and B operate as a rotational angle detecting apparatus of the input shaft 6. Also, the calculation processing circuit 10 can calculate the relative rotation angle of the output shaft 7 on the basis of the detection signals of the magnetometric sensors C and D; thus, the calculation processing circuit 10 and the magnetometric sensors C and D operate as a rotational angle detecting apparatus of the output shaft 7.

When a torque is applied to the input shaft 6, a difference is generated between each of the detection signals of the magnetometric sensors A and B and each of the detection signals of the magnetometric sensors C and D. Between the magnetometric sensors A and C and the magnetometric sensors B and D, the phases thereof are arranged so as to be different from each other by, for instance, electrical angle 90° in the circumferential direction of the target plates 12_a_ and 12_b_.In each of the detection signals, non-linear rate of change becomes the maximum at the points of the relative maximum value and the relative minimum value, which are the changing points between the rising and the lowering. However, since the phases are different from each other, both can complement each other. If the complement is possible, the phase angles, which are different from each other, may be set to any electrical angle from 1° to 360° or less.

Here, the difference between the detection signal of the magnetometric sensor A and the detection signal of the magnetometric sensor C, or the difference between the detection signal of the magnetometric sensor B and the detection signal of the magnetometric sensor D corresponds to the difference between the rotational angles of the input shaft 6 and the output shaft 7 (relative angular displacement). The relative angular displacement corresponds to the torsion angle generated on the torsion bar 9 connecting the input shaft 6 and the output shaft 7 under the influence of the torque applied to the input shaft 6. Accordingly, on the basis of the difference among the above-described detection signals, the torque applied to the input shaft 6 can be calculated.

Same as the magnetometric sensors C and D, the magnetometric sensors E and F are different from each other in phase by electrical angle 90° in the circumferential direction of the target plate 12_c_.While the number of the targets 3_b_ opposite to the magnetometric sensor C and the magnetometric sensor D is 37, the number of the targets 3_c_ opposite to the magnetometric sensor E and the magnetometric sensor F is 36. Accordingly, as shown in FIG. 4, every time when the output shaft 7 performs 1 phase rotation, the magnetometric sensors C, E and the magnetometric sensors D, F output detection signals of which phases displace each other by 1/37 phases each.

Figure 4:
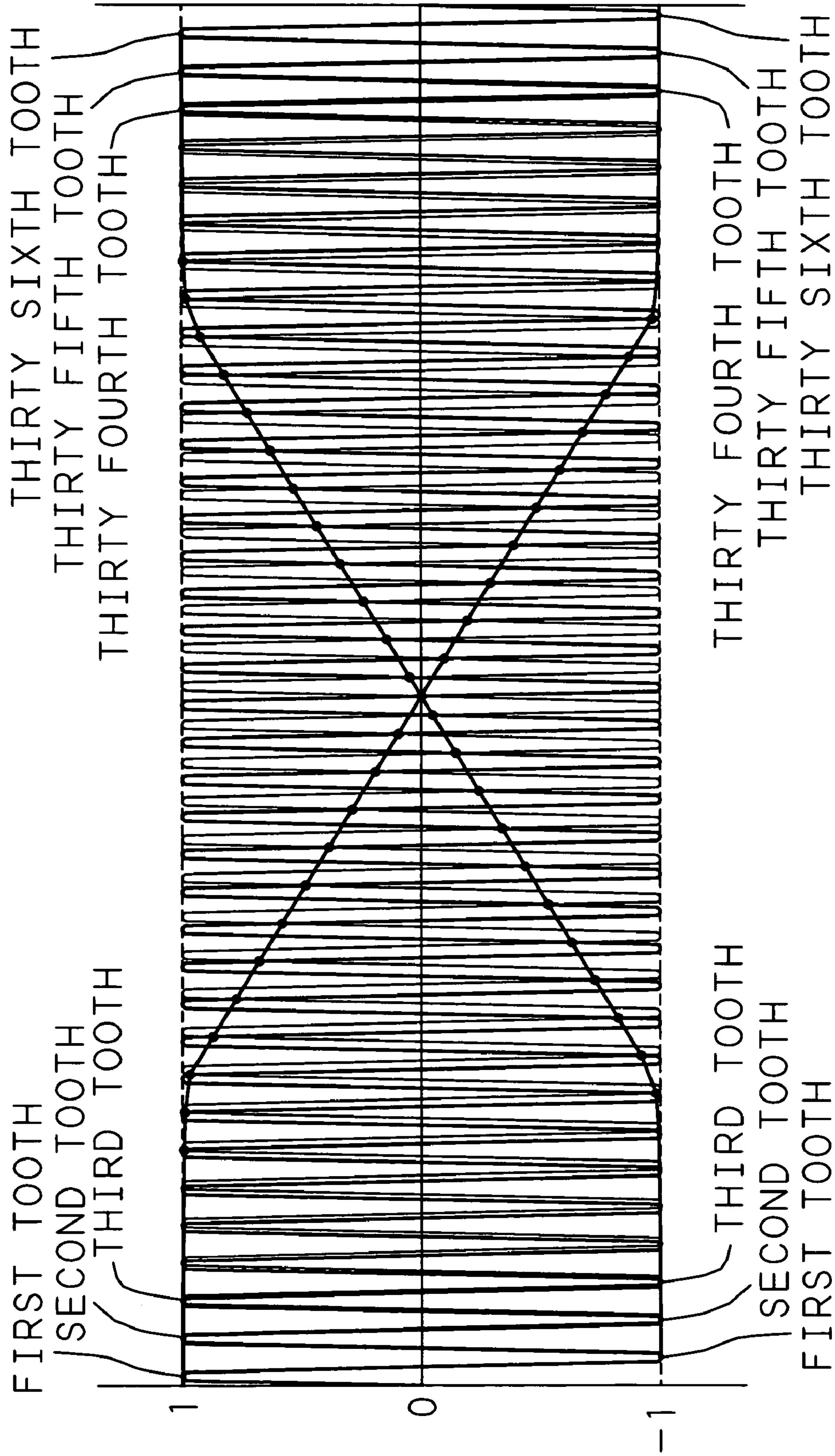
FIG. 4 is a diagram showing an example of waveform of detection signals detected by magnetometric sensors in which the number of opposite targets is different from each other.

In the case where magnetometric sensors C, E only or magnetometric sensors D, F only are provided, as shown in FIG. 4, while the output shaft 7 rotates 360°, a set, which has the same value of detection signals, appears twice. Accordingly, the rotational angle (absolute rotation angle) of the output shaft 7 cannot be determined. However, by referring to the electrical angles $\theta_{CD}$ and $\theta_{EF}$ (electrical angles of the targets 3_b_ and 3_c_) in the table 14, the rotational angle of the output shaft 7 can be determined.

Figure 5:
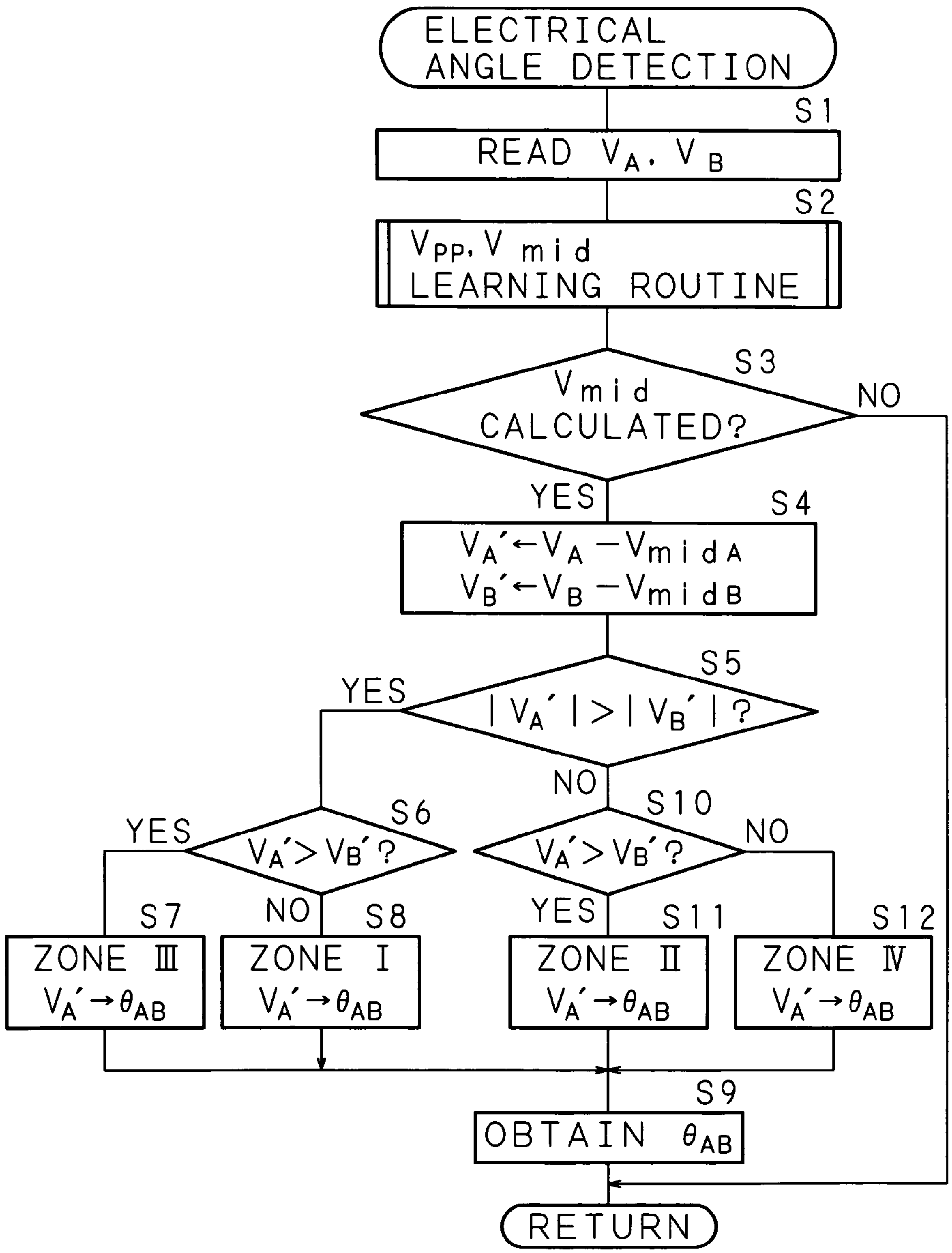
FIG. 5 is a flowchart showing an example of operation of a calculation processing circuit.
Figure 6:
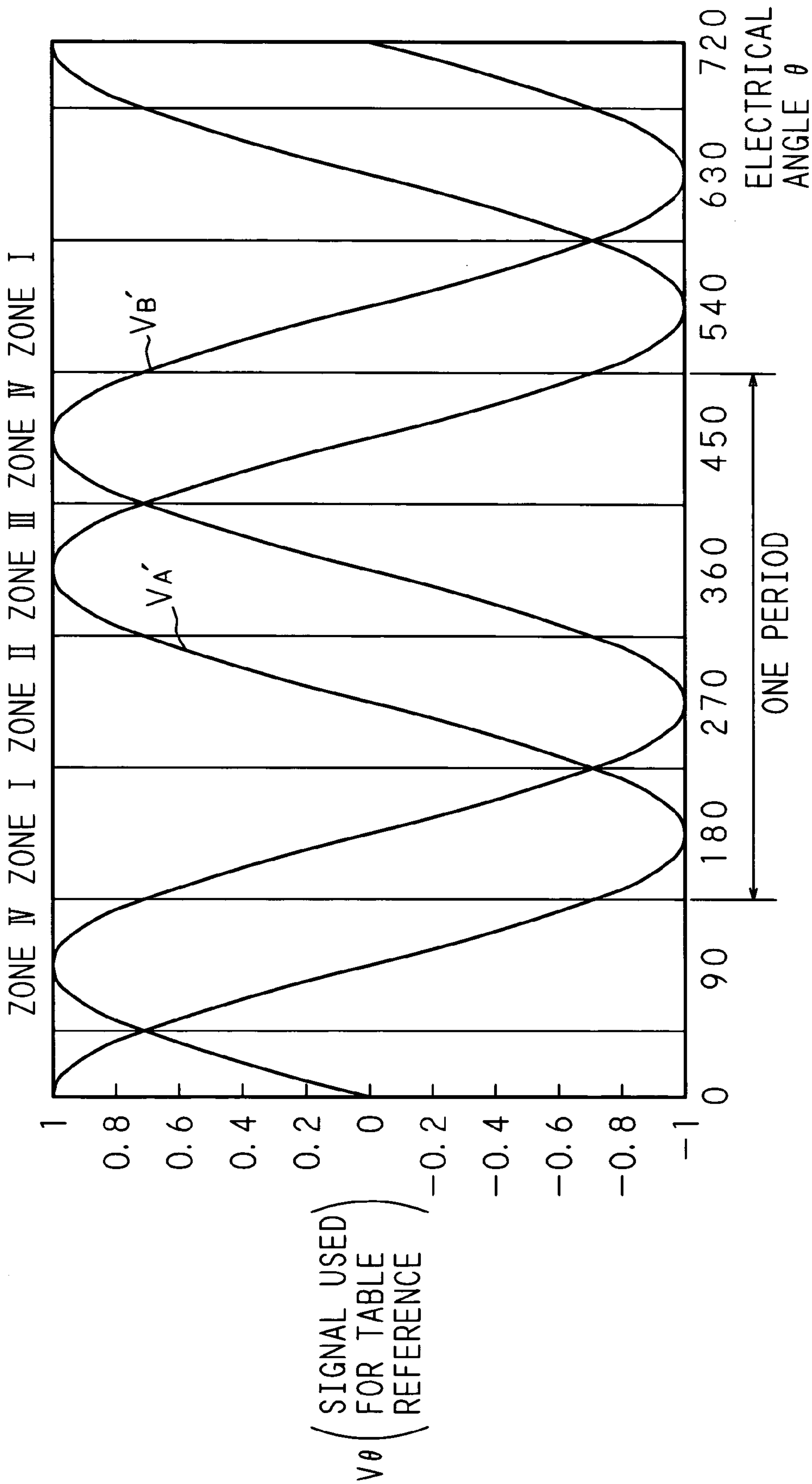
FIG. 6 is a diagram showing contents of a table storing an example of relation between corrected detection signal measured in advance and electrical angle.

Referring to the flowcharts shown in FIGS. 5, 7 and 11, the operation of an electric power steering apparatus, which has the constitution as described above, will be described below. FIG. 5 is a flowchart showing the operation for obtaining an electrical angle of each of the detection signals of magnetometric sensors A and B using a table storing a relation between the corrected detection signals $V_A'$ and $V_B'$ shown in FIG. 6, which are measured in advance before shipment from plant, and the electrical angles. This flowchart can be applied to the operation for obtaining the electrical angle of the detection signals from the magnetometric sensors C and D and the magnetometric sensors E and F. To obtain the detection signals of the magnetometric sensors C and D and the magnetometric sensors E and F, the respective tables same as that shown in FIG. 6 are used.

First of all, the calculation processing circuit 10 reads detection signals $V_A$, $V_B$ from the magnetometric sensors A, B (S1), then in the sensor output correction section 10_b_, a routine, in which each p—p value Vpp (peak-to-peak value) of the respective detection signals and the intermediate value Vmid thereof are learned and calculated, is executed (S2).

When the intermediate value $Vmid_A$, $Vmid_B$ of each detection signal has not been calculated (S3), the procedure is returned. When the intermediate value $Vmid_A$, $Vmid_B$ of each detection signal has been calculated (S3), the sensor output correction section 10*b* calculates $V_A'=V_A-Vmid_A$ and $V_B'=V_B'-Vmid_B$, and converts detection signals $V_A$ and $V_B$ to detection signals $V_A'$ to $V_B'$ when the intermediate value is 0 (S4).

Then, the calculation processing circuit 10 compares the magnitude of the absolute values $|V_A'|$ and $|V_B'|$ of the detection signals $V_A'$ and $V_B'$ in the steering angle calculating section 10*c* (S5). Here, in the zones I to IV in the table shown in FIG. 6, the zones, where the $|V_A'|$ is larger, are zone I and zone III. When $|V_A'|$ is larger (S5), the steering angle calculating section 10*c* compares the magnitude of the detection signals $V_A'$ and $V_B'$, and determines in which zone I or zone III the detection signals $V_A'$ and $V_B'$ are included (S6).

When the $V_A'$ is larger (S6), the steering angle calculating section 10*c* determines that the detection signal $V_A'$ resides in zone III, and refers to zone III, to search (S7) and obtain (S9) electrical angle $\theta_{AB}$ of the detection signal $V_A'$, and the procedure is returned. If the phase (at the center of steering angle) of the magnetometric sensor used for calculating the torque or steering angle the same as the phase of the magnetometric sensor at the output shaft 7 side, the electrical angle $\theta_{AB}$ of the detection signal $V_B'$ may be used in place of the electrical angle $\theta_{AB}$ of the detection signal $V_A'$.

When the $V_B'$ is larger (S6), the steering angle calculating section 10*c* determines that the detection signal $V_A'$ resides in the zone I, and refers to the zone I to search (S8) and obtain (S9) the electrical angle $\theta_{AB}$ of the detection signal $V_A'$ and the procedure is returned.

The steering angle calculating section 10*c* compares the magnitude of the absolute values $|V_A'|$ and $|V_B'|$ of the detection signals $V_A'$ and $V_B'$ (S5), and when the $|V_B'|$ is larger, the steering angle calculating section 10*c* compares the magnitude of the detection signals $V_A'$ and $V_B'$ to determine which zone; i.e., the zone II or the zone IV, the detection signal $V_A'$ resides in (S10). As shown in FIG. 6, the zone, where the $|V_B'|$ is larger, is the zone II and the zone IV.

Figure 8:
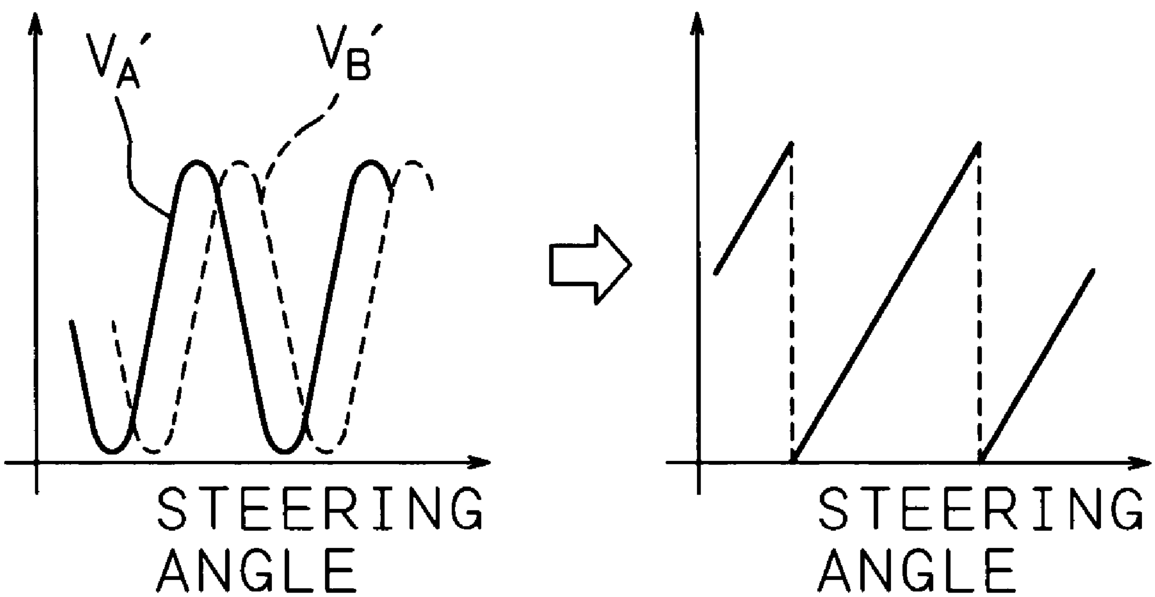
FIGS. 8 are diagrams showing an example of operation of a steering angle calculating section.

When the $V_A'$ is larger (S10), the steering angle calculating section 10*c* determines that the detection signal $V_A'$ resides in the zone II, and refers to the zone II to search (S11) and obtain (S9) the electrical angle $\theta_{AB}$ of the detection signal $V_A'$, and the procedure is returned. When the $V_B'$ is larger (S10), the steering angle calculating section 10*c* determines that the detection signal $V_A'$ resides in the zone IV, and refers to the zone IV to search (S12) and obtain (S9) the electrical angle $\theta_{AB}$ of the detection signal $V_A'$ and the procedure is returned. By carrying out the above steps, as shown in FIG. 8, on the basis of the detection signals $V_A'$ and $V_B'$, the rotational angle (steering angle) of the input shaft 6 can be obtained.

Figure 7:
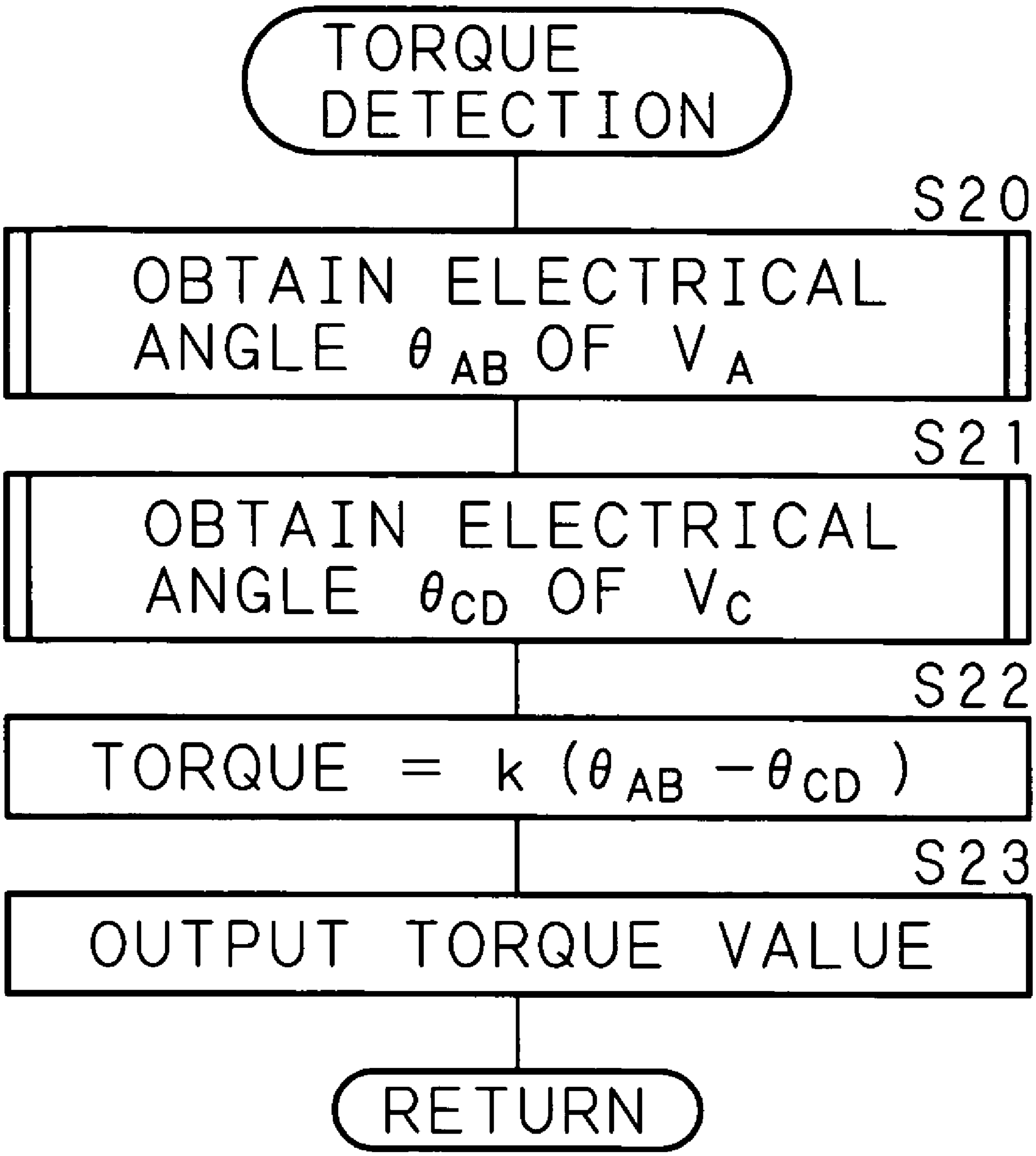
FIG. 7 is a flowchart showing an example of operation of the calculation processing circuit.
Figure 9:
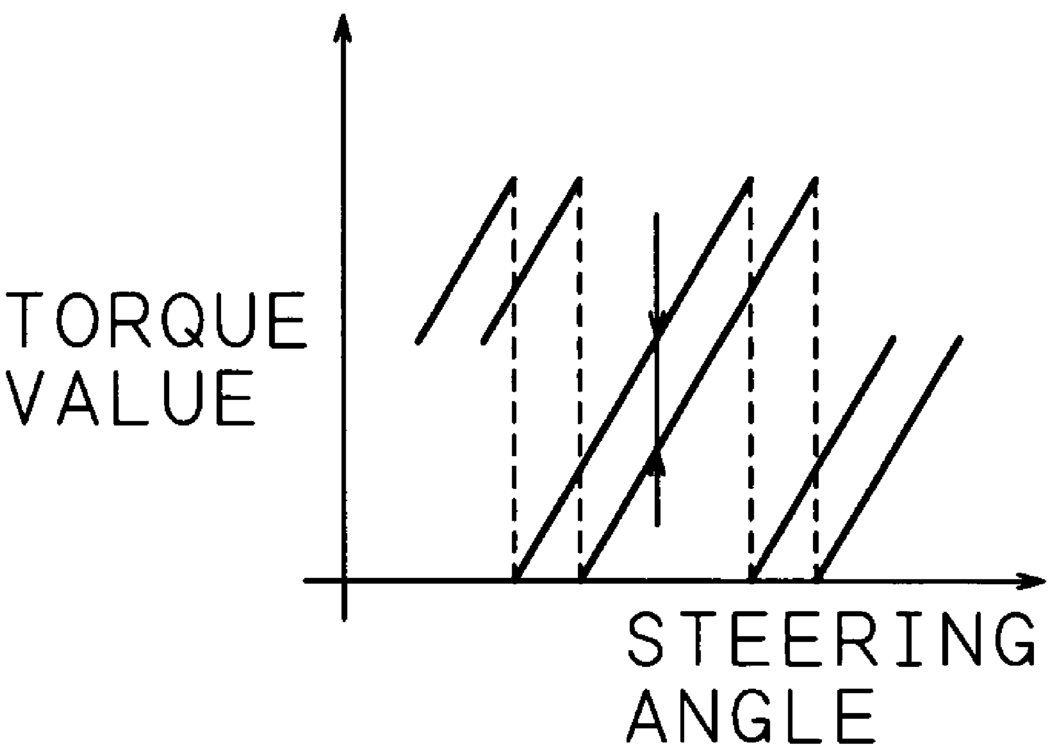
FIG. 9 is a diagram showing an example of operation of a torque calculating section.
Figure 10:
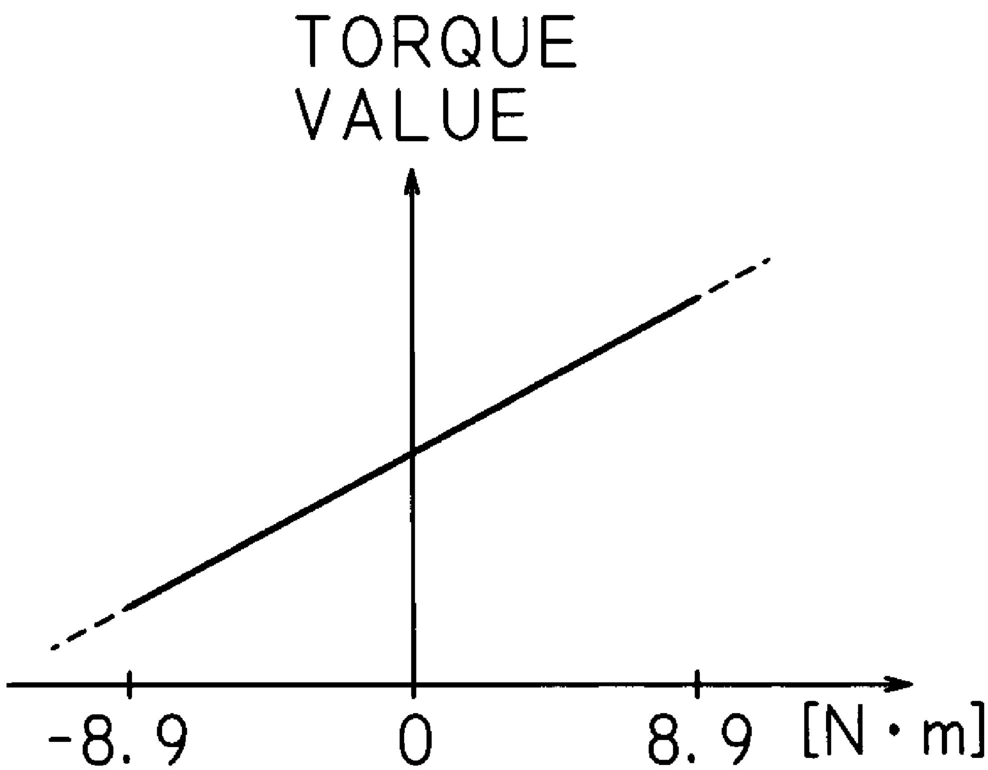
FIG. 10 is a diagram showing an example of torque value outputted by the torque calculating section.

FIG. 7 is a flowchart showing the operation for detecting the torque using the table in FIG. 6. First of all, in accordance with the flowchart in FIG. 5, the calculation processing circuit 10 obtains the electrical angle $\theta_{AB}$ of the magnetometric sensor A from the detection signals $V_A$ and $V_B$ of the magnetometric sensors A and B in the steering angle calculating section 10*c* (S20). And then, in the same manner, on the basis of the detection signals $V_C$ and $V_D$ of the magnetometric sensors C and D, the electrical angle $\theta_{CD}$ of the magnetometric sensor C is obtained (S21). Then, the calculation processing circuit 10 calculates torque=$k(\theta_{AB}-\theta_{CD})$ (k is a spring constant of the torsion bar 9), as shown in FIG. 9, calculates torque value as shown in FIG. 10 from the difference of the electrical angles in the torque calculating section 10*d* (S22) and outputs the calculated torque value (S23), and the procedure is returned.

Figure 11:
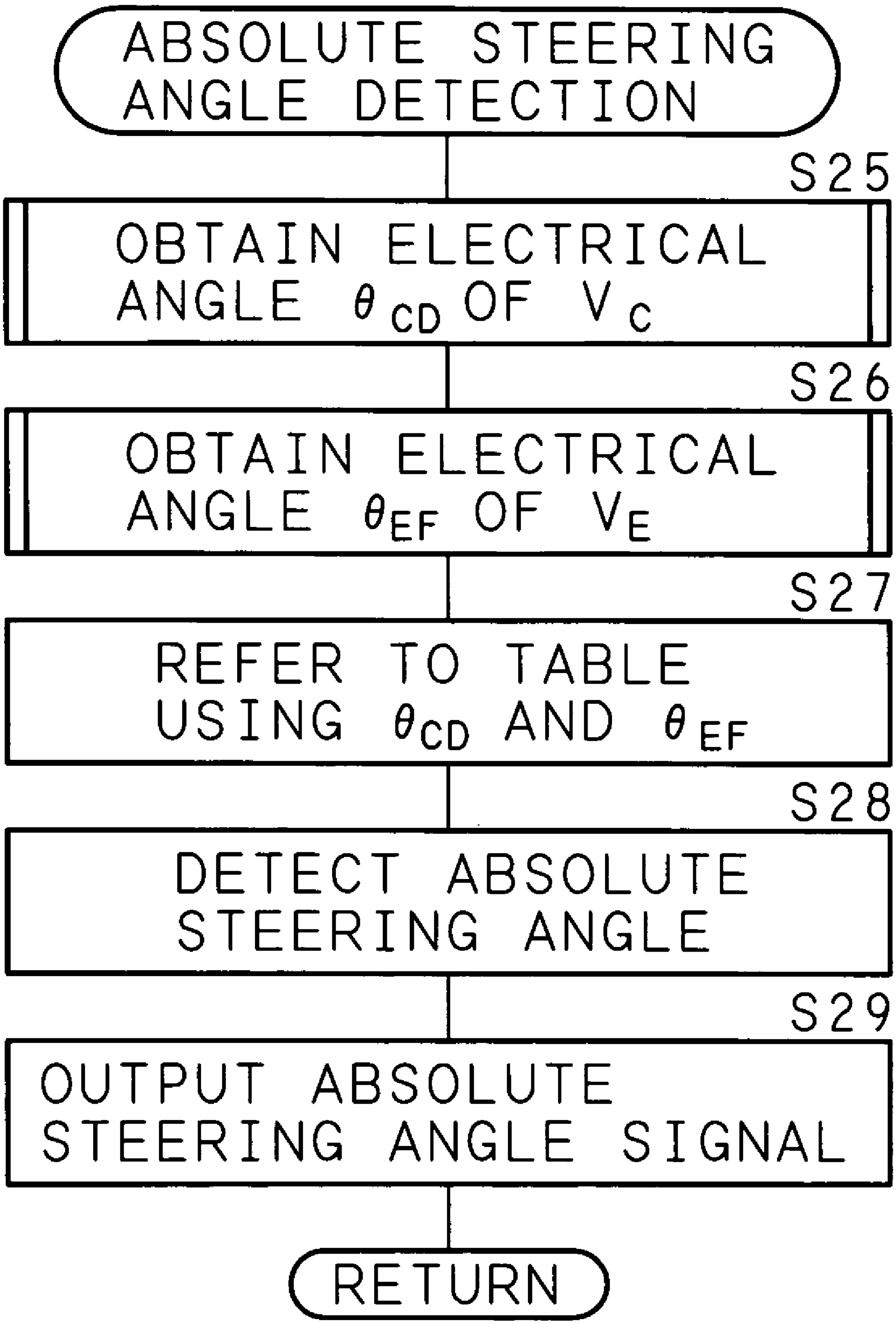
FIG. 11 is a flowchart showing an example of operation of the calculation processing circuit.
Figure 12:
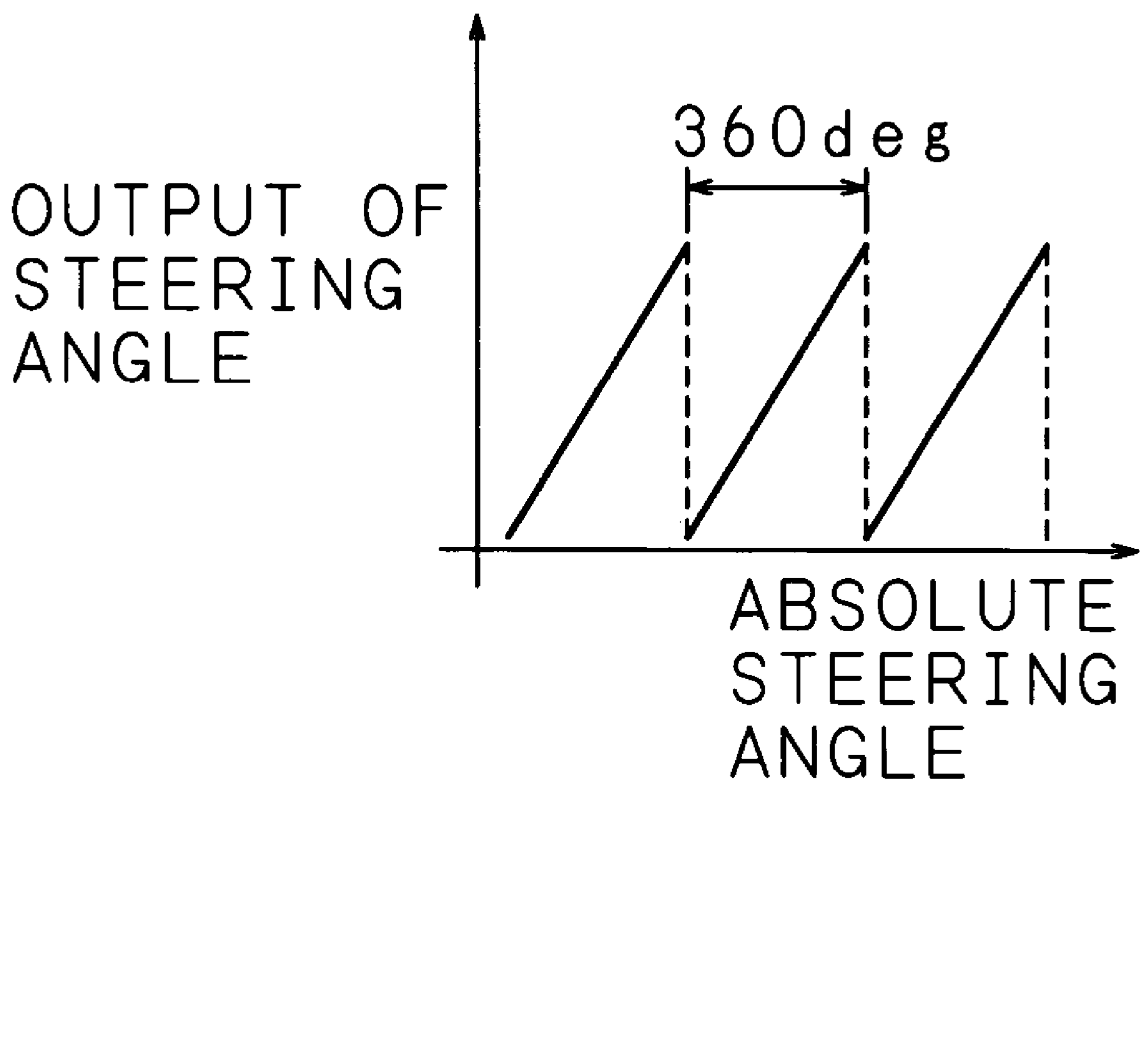
FIG. 12 is a diagram showing an example of absolute steering angle outputted an absolute steering angle calculating section.

FIG. 11 is a flowchart showing the operation for detecting the absolute steering angle using the table in FIG. 6. First of all, in the same manner as the flowchart in the above FIG. 5, the calculation processing circuit 10 obtains the electrical angle $\theta_{CD}$ of the detection signal $V_C$ from the detection signals $V_C$ and $V_D$ of the magnetometric sensors C and D in the steering angle calculating section 10*c* (S25). Then, in the same manner, the electrical angle $\theta_{EF}$ of the detection signal $V_E$ is obtained from the detection signals $V_E$ and $V_F$ of the magnetometric sensors E and F (S26). Then, the calculation processing circuit 10 refers to the table 14 with respect to the electrical angles $\theta_{CD}$ and $\theta_{EF}$ in the absolute steering angle calculating section 10*e* (S27), as shown in FIG. 12, detects the absolute steering angle corresponding to the electrical angles $\theta_{CD}$ and $\theta_{EF}$ (S28) and outputs the detected absolute steering angle signal (S29), and the procedure is returned.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A rotational angle detecting apparatus for detecting a rotational angle of a rotor, comprising:

one or a plurality of first targets provided at the rotor;

second targets provided at the rotor or another rotor rotating coaxially with the rotor, the number of which is coprime with the number of the first targets;

two sensors C, D, disposed opposite to the first targets, for outputting detection signals $V_C$, $V_D$ having phases different from each other in accordance with each position of the first targets as the rotor provided with the first targets rotates;

two sensors E, F, disposed opposite to the second targets, for outputting detection signals $V_E$, $V_F$ having phases different from each other in accordance with each position of the second targets as the rotor provided with the second targets rotates; and a calculation processing circuit including:

a table that stores predetermined data relating values of corrected detection signals $V_C'$, $V_C'$ and $V_E'$, $V_F'$ and detected signal phase zones $Z_{CD}$, $Z_{EF}$ to electrical angles $\theta_{CD}$, $\theta_{EF}$, respectively;

a sensor output correction section that calculates intermediate values $V_{midC}$, $V_{midD}$, $V_{midE}$, $V_{midF}$ from peak-to-peak values for detection signals $V_C$, $V_D$, $V_E$, $V_F$ respectively, and calculates corrected detection signals $V_C'$, $V_D'$, $V_E'$, $V_F'$ from $V_{midC}$, $V_{midD}$, $V_{midE}$, $V_{midF}$ and point values of $V_C$, $V_D$, $V_E$, $V_F$, respectively;

a steering angle calculating section that compares the magnitudes of the absolute values of corrected detection signals $V_C'$, $V_D'$, compares the magnitudes of the absolute values of corrected detection signals $V_E'$, $V_F'$, compares the magnitudes of corrected detection signals $V_C'$, $V_D'$, compares the magnitudes of corrected detection signals $V_E'$, $V_F'$, determines signal phase zones $Z_{CD}$, $Z_{EF}$ for corrected detection signals $V_C'$, $V_D'$ and $V_E'$, $V_F'$, respectively, based on the results of the comparisons, and retrieves values for the electrical angles $\theta_{CD}$ and $\theta_{EF}$ from the table based on the determined signal phase zones $Z_{CD}$, $Z_{EF}$, and corrected detection signals $V_C'$, $V_D'$ and $V_E'$, $V_F'$, respectively; and an absolute steering angle calculating section that detects the rotational angle of the rotor on the basis of the obtained electrical angles $\theta_{CD}$, $\theta_{EF}$.

2. The rotational angle detecting apparatus according to claim 1, wherein the rotor is a gear having teeth made of magnetic material, which are arranged on a peripheral surface of the rotor at regular intervals, as the first targets or second targets.

3. The rotational angle detecting apparatus according to claim 2, wherein the sensors are magnetometric sensors using an element having such a characteristic that the electrical characteristic changes due to the influence of the magnetic field.

4. A rotational angle detecting apparatus, comprising:

one or a plurality of first targets provided at a rotor;

second targets provided at the rotor or another rotor rotating coaxially with the rotor, the number of which is coprime with the number of the first targets;

two detection means C, D, disposed opposite to the first targets, for outputting detection signals $V_C$, $V_D$ having phases different from each other in accordance with each position of the first targets as the rotor provided with the first targets rotates;

two detection means E, F, disposed opposite to the second targets, for outputting detection signals $V_E$, $V_F$ having phases different from each other in accordance with each position of the second targets as the rotor provided with the second targets rotates;

storing means storing predetermined data relating values of corrected detection signals $V_C'$, $V_D'$ and $V_E'$, $V_F'$ and detected signal phase zones $Z_{CD}$, $Z_{EF}$ to electrical angles $\theta_{CD}$ and $\theta_{EF}$, respectively;

determination means for calculating intermediate values $V_{midC}$, $V_{midD}$, $V_{midE}$, $V_{midF}$ from peak-to-peak values for detection signals $V_C$, $V_D$, $V_E$, $V_F$ respectively, calculating corrected detection signals $V_C'$, $V_D'$, $V_E'$, $V_D'$ from $V_{midC}$, $V_{midD}$, $V_{midE}$, $V_{midF}$ and point values of $V_C$, $V_D$, $V_E$, $V_F$, respectively, comparing the magnitudes of the absolute values of corrected detection signals $V_C'$, $V_D'$, comparing the magnitudes of the absolute values of corrected detection signals $V_E'$, $V_F'$, comparing the magnitudes of corrected detection signals $V_C'$, $V_D'$, comparing the magnitudes of corrected detection signals $V_E'$, $V_F'$, and determining phase zones $Z_{CD}$, $Z_{EF}$ for corrected detection signals $V_C'$, $V_D'$ and $V_E'$, $V_F'$, respectively, based on the results of the comparisons;

obtaining means for retrieving values for the electrical angles $\theta_{CD}$ and $\theta_{EF}$ from the table based on the determined phase zones $Z_{CD}$, $Z_{EF}$ and corrected detection signals $V_C'$, $V_D'$, and $V_E'$, $V_F'$, respectively,; and rotational angle detection means for detecting the rotational angle of the rotor on the basis of the electrical angles $\theta_{CD}$, $\theta_{EF}$ obtained by the obtaining means.

5. A torque detecting apparatus for detecting a torque applied to a first shaft or a second shaft which is connected to the first shaft via a connection shaft, comprising:

a first rotor coaxially provided to the first shaft;

a second rotor coaxially provided to the second shaft;

one or a plurality of first targets provided at the first rotor;

one or a plurality of second targets provided at the second rotor;

two sensors A, B, disposed opposite to the first targets, for outputting detection signals $V_A$, $V_B$ having phases different from each other in accordance with each position of the first targets as the first rotor rotates;

two sensors C, D, disposed opposite to the second targets, for outputting detection signals $V_C$, $V_D$ having phases different from each other in accordance with each position of the second targets as the second rotor rotates;

a calculation processing circuit including:

a table that stores predetermined data relating values of corrected detection signals $V_A'$, $V_B'$ and $V_C'$, $V_D'$ and a detected signal phase zone Z to electrical angles $\theta_{AB}$ and $\theta_{CD}$, respectively;

a sensor output correction section that calculates intermediate values $V_{midA}$, $V_{midB}$, $V_{midC}$, $V_{midD}$ from peak-to-peak values for detection signals $V_A$, $V_B$, $V_C$, $V_D$ respectively, and calculates corrected detection signals $V_A'$, $V_B'$, $V_C'$, $V_D'$ from $V_{midA}$, $V_{midB}$, $V_{midC}$, $V_{midD}$ and point values of $V_A$, $V_B$, $V_C$, $V_D$, respectively;

a steering angle calculating section that compares the magnitudes of the absolute values of corrected detection signals $V_A'$, $V_B'$, compares the magnitudes of the absolute values of corrected detection signals $V_C'$, $V_D'$, compares the magnitudes of corrected detection signals $V_A'$, $V_B'$, compares the magnitudes of corrected detection signals $V_C'$, $V_D'$, determines phase zones $Z_{AB}$, $Z_{CD}$ for corrected detection signals $V_A'$, $V_B'$ and $V_C'$, $V_D'$, respectively, based on the results of the comparisons, and retrieves values for the electrical angles $\theta_{AB}$ and $\theta_{CD}$ from the table based on the determined phase zones $Z_{AB}$, $Z_{CD}$ and corrected detection signals $V_A'$, $V_B'$ and $V_C'$, $V_D'$, respectively; and a torque calculating section that detects the torque applied to the first shaft or second shaft on the basis of the obtained electrical angles $\theta_{AB}$, $\theta_{CD}$.

6. The torque detecting apparatus according to claim 5, wherein the rotors are gears having teeth made of magnetic material, which are arranged on peripheral surfaces of the rotors at regular intervals, as the first targets or second targets.

7. The torque detecting apparatus according to claim 6, wherein the sensors are magnetometric sensors using an element having such a characteristic that the electrical characteristic changes due to the influence of the magnetic field.

8. A torque detecting apparatus, comprising:

rotors coaxially provided to a first shaft and a second shaft connected via a connection shaft;

one or a plurality of targets provided at each of the rotors;

two detection means A, B, disposed opposite to the first targets, for outputting detection signals $V_A$, $V_B$ having phases different from each other in accordance with each position of the first targets as the rotor provided with the first targets rotates;

two detection means C, D, disposed opposite to the second targets, for outputting detection signals $V_C$, $V_D$ having phases different from each other in accordance with each position of the second targets as the rotor provided with the second targets rotates;

storing means storing predetermined data relating values of corrected detection signals $V_A'$, $V_B'$ and $V_C'$, $V_D'$ and a detected signal phase zone Z to electrical angles $\theta_{AB}$ and $\theta_{CD}$, respectively;

determination means for calculating intermediate values $V_{midA}$, $V_{midB}$, $V_{midC}$, $V_{midD}$ from peak-to-peak values for detection signals $V_A$, $V_B$, $V_C$, $V_D$ respectively, calculating corrected detection signals $V_A'$, $V_B'$, $V_C'$, $V_D'$ from $V_{midA}$, $V_{midB}$, $V_{midC}$, $V_{midD}$ and point values of $V_A$, $V_B$, $V_C$, $V_D$, respectively, comparing the magnitudes of the absolute values of corrected detection signals $V_A'$, $V_B'$, comparing the magnitudes of the absolute values of corrected detection signals $V_C'$, $V_D'$, comparing the magnitudes of corrected detection signals $V_A'$, $V_B'$, comparing the magnitudes of corrected detection signals $V_C'$, $V_D'$, and determining phase zones $Z_{AB}$, $Z_{CD}$ for corrected detection signals $V_A'$, $V_B'$ and $V_C'$, $V_D'$, respectively, based on the results of the comparisons;

obtaining means for retrieving values for the electrical angles $\theta_{AB}$ and $\theta_{CD}$ from the table based on the determined phase zones $Z_{AB}$, $Z_{CD}$ and corrected detection signals $V_A'$, $V_B'$ and $V_C'$, $V_D'$, respectively,; and torque detecting means for detecting the torque applied to the first shaft or the second shaft on the basis of the electrical angle angles $\theta_{AB}$, $\theta_{CD}$ obtained by the obtaining means.

9. A method for detecting a rotational angle of a rotor, wherein the rotor has one or a plurality of first targets provided at the rotor and second targets provided at the rotor or another rotor rotating coaxially with the rotor, the number of which is coprime with the number of the first targets, the method comprising the steps of (a) outputting detection signals $V_C$, $V_D$ from sensors C, D, disposed opposite to the first targets having phases different from each other in accordance with each position of the first targets as the rotor provided with the first targets rotates;

(b) outputting detection signals $V_E$, $V_F$ from sensors E, F, disposed opposite to the second targets having phases different from each other in accordance with each position of the second targets as the rotor provided with the second targets rotates;

(c) storing predetermined data relating values of corrected detection signals $V_C'$, $V_D'$ and $V_E'$, $V_F'$ and a detected signal phase zone Z to electrical angles $\theta_{CD}$ and $\theta_{EF}$, respectively, in a table;

(d) calculating intermediate values $V_{midC}$, $V_{midD}$, from peak-to-peak values for detection signals $V_C$, $V_D$, respectively;

(e) calculating corrected detection signals $V_C'$, $V_D'$, from $V_{midC}$, $V_{midD}$, and coincidently-measured values of $V_C$, $V_D$, respectively;

(f) comparing the magnitudes of the absolute values of corrected detection signals $V_C'$, $V_D'$;

(g) comparing the magnitudes of corrected detection signals $V_C'$, $V_D'$;

(h) determining a phase zone $Z_{CD}$ for corrected detection signals $V_C'$, $V_D'$, based on the results from the comparison steps;

(i) retrieving a value for the electrical angle $\theta_{CD}$ from the table based on the determined phase zone $Z_{CD}$ and corrected detection signals $V_C'$, $V_D'$;

(j) repeating the steps (d) through (i) for detection signals $V_E$, $V_F$ to retrieve a value for the electrical angle $\theta_{EF}$ from the table based on a second determined phase zone $Z_{EF}$ and corrected detection signals $V_E'$, $V_F'$; and (k) detecting the torque applied to the first shaft or the second shaft on the basis of the obtained electrical angles $\theta_{CD}$, $\theta_{EF}$.

10. A method for detecting a torque applied to a first shaft or a second shaft which is connected to the first shaft via a connection shaft, wherein a first rotor is coaxially applied to the first shaft and a second rotor is coaxially applied to the second shaft, one or a plurality of first targets are provided at the first rotor and one or a plurality of second targets are provided at the second rotor, the method comprising the steps of (a) outputting detection signals $V_A$, $V_B$ from sensors A, B, disposed opposite to the first targets having phases different from each other in accordance with each position of the first targets as the rotor provided with the first targets rotates;

(b) outputting detection signals $V_C$, $V_D$ from sensors C, D, disposed opposite to the second targets having phases different from each other in accordance with each position of the second targets as the rotor provided with the second targets rotates;

(c) storing predetermined data relating values of corrected detection signals $V_A'$, $V_B'$ and $V_C'$, $V_D'$ and a detected signal phase zone Z to electrical angles $\theta_{AB}$ and $\theta_C$, respectively, in a table;

(d) calculating intermediate values $V_{midA}$, $V_{midB}$, from peak-to-peak values for detection signals $V_A$, $V_B$, respectively;

(e) calculating corrected detection signals $V_A'$, $V_B'$, from $V_{midA}$, $V_{midB}$, and coincidently-measured values of $V_A$, $V_B$, respectively;

(f) comparing the magnitudes of the absolute values of corrected detection signals $V_A'$, $V_B'$;

(g) comparing the magnitudes of corrected detection signals $V_A'$, $V_B'$;

(h) determining a phase zone $Z_{AB}$ for corrected detection signals $V_A'$, $V_B'$ based on the results from the comparison steps;

(i) retrieving a value for the electrical angle $\theta_{AB}$ from the table based on the determined phase zone $Z_{AB}$ and corrected detection signals $V_A'$, $V_B'$;

(j) repeating the steps (d) through (i) for detection signals $V_C$, $V_D$ to retrieve a value for the electrical angle $\theta_{CD}$ from the table based on a second determined phase zone $Z_{CD}$ and corrected detection signals $V_C'$, $V_D'$; and (k) detecting the rotational angle of the rotor on the basis of the obtained electrical angles $\theta_{AB}$, $\theta_{CD}$.

* * * * *